United States Patent
Lee

(10) Patent No.: US 10,674,439 B2
(45) Date of Patent: Jun. 2, 2020

(54) METHOD AND APPARATUS FOR COMMUNICATION IN WIRELESS COMMUNICATION SYSTEM

(71) Applicant: Samsung Electronics Co., Ltd., Suwon-si, Gyeonggi-do (KR)

(72) Inventor: Hyewon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 15/654,627

(22) Filed: Jul. 19, 2017

(65) Prior Publication Data

US 2018/0027603 A1   Jan. 25, 2018

(30) Foreign Application Priority Data

Jul. 19, 2016   (KR) .................. 10-2016-0091605

(51) Int. Cl.
| | | |
|---|---|---|
| *H04W 48/16* | (2009.01) | |
| *H04W 8/00* | (2009.01) | |
| *H04W 4/80* | (2018.01) | |
| *H04W 76/15* | (2018.01) | |
| *H04W 8/20* | (2009.01) | |
| *H04W 88/06* | (2009.01) | |
| *H04W 28/16* | (2009.01) | |

(52) U.S. Cl.
CPC .......... *H04W 48/16* (2013.01); *H04W 8/005* (2013.01); *H04W 4/80* (2018.02); *H04W 8/205* (2013.01); *H04W 28/16* (2013.01); *H04W 76/15* (2018.02); *H04W 88/06* (2013.01)

(58) Field of Classification Search
CPC .......................... H04W 76/025; H04W 4/008
See application file for complete search history.

(56) References Cited

U.S. PATENT DOCUMENTS

| | | |
|---|---|---|
| 9,009,475 B2 | 4/2015 | Hauck et al. |
| 2007/0004457 A1 | 1/2007 | Han |

(Continued)

FOREIGN PATENT DOCUMENTS

| | | |
|---|---|---|
| KR | 10-0735427 B1 | 7/2007 |
| KR | 10-0796525 B1 | 1/2008 |
| WO | 2014209579 A2 | 12/2014 |

OTHER PUBLICATIONS

European Patent Office, "Supplementary European Search Report," Application No. EP17831350.8, dated Feb. 4, 2019, 11 pages.

(Continued)

*Primary Examiner* — Zhiren Qin

(57) ABSTRACT

A method and an apparatus for performing communication in a wireless communication system are provided. According to an embodiment of the present disclosure, a method of a terminal including at least one subscriber identification module (SIM) includes: acquiring information on SIMs and radio frequency (RF) modules included in a plurality of terminals within a predetermined distance from the terminal; establishing a connection relationship between the at least one SIM included in the plurality of terminals and the at least one RF module included in the plurality of terminals based on the acquired information; and performing wireless communication based on the connection relationship.

18 Claims, 12 Drawing Sheets

(56) References Cited

U.S. PATENT DOCUMENTS

| | | | |
|---|---|---|---|
| 2010/0304670 A1* | 12/2010 | Shuo | H04M 1/7253 |
| | | | 455/41.1 |
| 2012/0115542 A1 | 5/2012 | Griffin et al. | |
| 2013/0023255 A1* | 1/2013 | Yang | H04M 1/7253 |
| | | | 455/418 |
| 2013/0203378 A1* | 8/2013 | Vos | H04W 4/24 |
| | | | 455/406 |
| 2013/0316672 A1* | 11/2013 | Nousiainen | H04W 4/24 |
| | | | 455/406 |
| 2014/0229859 A1 | 8/2014 | Palin et al. | |
| 2014/0269757 A1* | 9/2014 | Park | H04L 49/201 |
| | | | 370/432 |
| 2015/0099562 A1 | 4/2015 | Xiong | |
| 2016/0088467 A1 | 3/2016 | Reddem et al. | |
| 2016/0149605 A1* | 5/2016 | Vecera | H04B 1/3816 |
| | | | 455/558 |

OTHER PUBLICATIONS

International Search Report, dated Oct. 26, 2017, regarding International Application No. PCT/KR2017/007775, 3 pages.

* cited by examiner

METHOD AND APPARATUS FOR COMMUNICATION IN WIRELESS COMMUNICATION SYSTEM

CROSS-REFERENCE TO RELATED APPLICATION(S) AND CLAIM OF PRIORITY

This application is related to and claims priority to Korean Application No. KR 10-2016-0091605 filed on Jul. 19, 2016, the contents of which are incorporated herein by reference.

TECHNICAL FIELD

Various embodiments of the present disclosure relate to a wireless communication system, and more particularly, to a method and an apparatus for easily using wireless communication through a plurality of terminal.

BACKGROUND

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed.

In addition, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, there is a need for a method for using, by a user, a wireless communication service at low cost by using a plurality of terminals.

SUMMARY

To address the above-discussed deficiencies, it is a primary object to provide disclosure a method and an apparatus for performing wireless communication using a subscriber identification module and a radio frequency (RF) module included in a plurality of terminals Various embodiments of the present disclosure are directed to the provision of a communication method of a terminal, the communication method comprising:

According to the embodiment of the present disclosure, it is possible to more easily perform the wireless communication using the subscriber identification module and the RF module included in the plurality of terminals.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
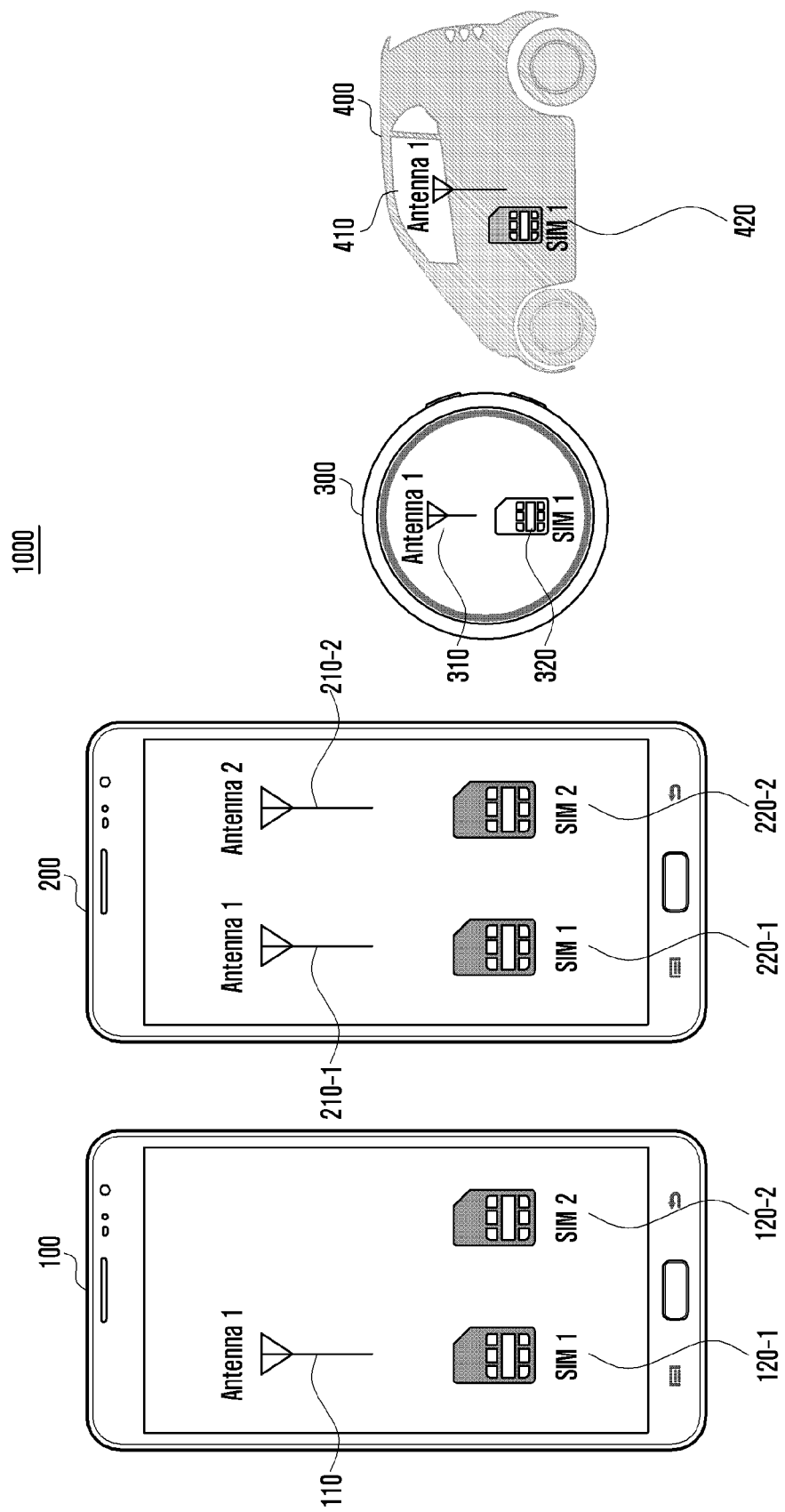
FIG. 1 illustrates a group of subscriber identification modules (SIMs) according to an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory capable of orienting a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term "~unit" used in the present embodiment means software or hardware components such as FPGA and ASIC and the "~unit" performs any roles. However, the meaning of the "~unit" is not limited to software or hardware. The "~unit" may be configured to be in a storage medium that may be addressed and may also be configured to reproduce one or more processor. Accordingly, for example, the "~unit" includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the "~units" may be combined with a smaller number of components and the "~units" or may further be separated into additional components and "~units." In addition, the components and the "~units" may also be implemented to reproduce one or more CPUs within a device or a security multimedia card.

The terminal according to the embodiment of the present disclosure may generally include a mobile terminal and may indicate a device that is subscribed in a mobile communication system to receive a service from the mobile communication system. The mobile terminal may include smart devices such as a smart phone and a tablet PC, which is only an example, and the present disclosure is not limited thereto.

FIG. 1 illustrates a subscriber identification module (SIM) group 1000 according to an embodiment of the present disclosure. The SIM group 1000 in the present disclosure means a system formed by a plurality of terminals each including at least one RF module or at least one subscriber identification module (SIM).

Although the SIM group 1000 illustrated in FIG. 1 is illustrated as including two smart phones, one smart watch, and one smart car, but a kind of terminals included in the SIM group 1000 is not limited. In addition, FIG. 1 illustrates the SIM group 1000 including first to fourth terminals 100 to 400, which is only an example, and therefore even the number of terminals included in the SIM group 1000 is not limited.

According to the embodiment illustrated in FIG. 1, a first terminal 100 includes a first antenna 110 and first and second SIMs 120-1 and 120-2. Further, the second terminal 200 includes first and second antennas 210-1 and 210-2 and first and second SIMs 220-1 and 220-2. In addition, the third terminal 300 includes a first antenna 310 and a first SIM 320, and the fourth terminal 400 includes a first antenna 310 and a first SIM 320. In addition, the terminal may include only at least one antenna without an SIM or only at least one SIM without an antenna.

The at least one antenna may be used for a wireless communication service while being included in a radio frequency (RF) module. The RF module is connected to a modem that may be a component for generating data within a terminal and for processing the generated data. Therefore, in the present disclosure, a terminal including an antenna or a modem may be interpreted as including an RF module and a modem including an antenna.

Meanwhile, the at least one SIM may be a universal subscriber identification module (USIM). The USIM is a combination of a SIM card including subscriber information and a universal IC card (UICC), and may be used for a wireless communication service. Alternatively, the SIM may be implemented as an embedded SIM (eSIM) (or electronic SIM) so that a profile of a wireless communication service provider may be dynamically installed or deleted. The SIM may store a profile required for network connection so that a user may use the wireless communication service.

According to the embodiment of the present disclosure, the first to fourth terminals 100-400 included in the SIM group 1000 may selectively use antennas 110, 210-1 210-2, 310, and 410 and SIMs 120-1, 120-2, 220-1, 220-2, 320, and 420, respectively that are included in the SIM group 1000 to support wireless communication of a user.

For example, if the first antenna 110 of the first terminal 100 and the first SIM 320 of the third terminal 300 are connected to each other, a user may use subscription information stored in the first SIM 320 of the third terminal 300 through the first antenna 110 of the first terminal 100 to use a wireless communication service. At this time, the user may use the wireless communication service through the first terminal 100 or the third terminal 300. However, the wireless communication service is not necessarily used through the terminal including the SIM or the antenna, and the user may use the second terminal 200 or the fourth terminal 400 in the SIM group 1000 to use the wireless communication service.

Hereinafter, a method of establishing a connection relationship between antennas and SIMs included in a plurality of terminals and performing wireless communication based on the connection relationship will be described in detail with reference to FIGS. 2 and 3.

Figure 2:
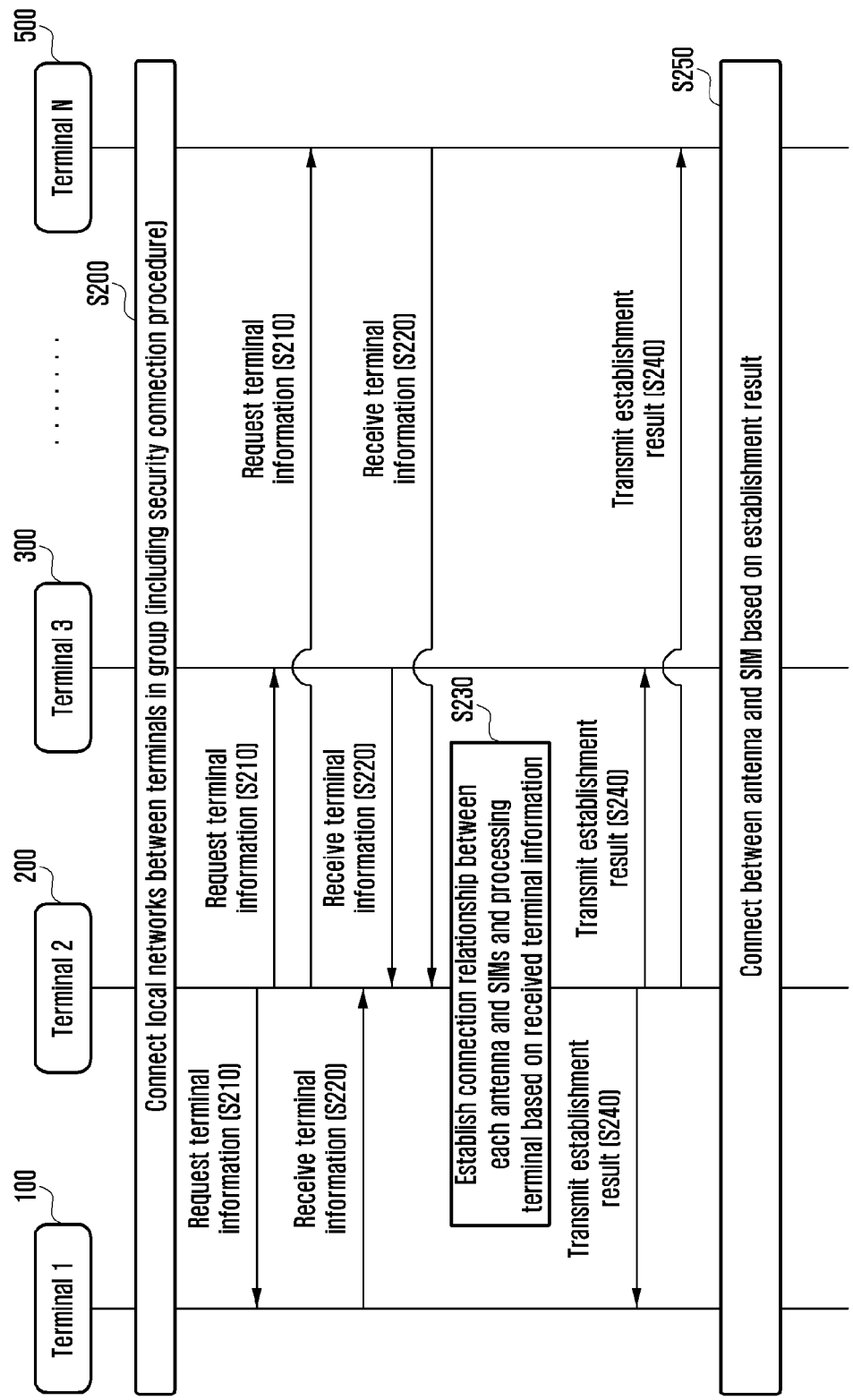
FIG. 2 illustrates a method for connecting between antennas and the SIMs included in a plurality of terminals according to an embodiment of the present disclosure.

First, FIG. 2 illustrates a method for connecting between the antennas and the SIMs included in the plurality of terminals according to an embodiment of the present disclosure.

A method for establishing a connection relationship between an SIM and an antenna based on terminal information between terminal 1 100, terminal 2 200, terminal 3 300 and terminal N 500 and connecting between the SIM and the antenna based on the establishment result will be described with reference to FIG. 2.

The terminal 1 100, the terminal 2 200, the terminal 3 300 and the terminal N 500 are terminals included in the same SIM group as described above, and may be any one of wearable devices such as a smartphone, a tablet PC, a mobile phone, a smart car, a desktop PC, a laptop PC, a netbook computer, a PDA, a PMP, and a smart watch.

According to an embodiment of the present disclosure, any terminal in the SIM group is a master terminal, and serves to identify functions of each terminal included in the SIM group and establish a connection relationship between each antenna and SIMs. In the embodiment illustrated in FIG. 2, it is assumed that the terminal 2 200 is the master terminal.

In step S200, local networks between terminals in a group may be connected to each other. For example, the terminals in the group may include a Bluetooth module. The terminals may perform Bluetooth pairing using the Bluetooth module to form a wireless network.

On the other hand, the use of Bluetooth as the connection method of local networks between terminals in a group is only an example, and therefore a wireless network may be formed by various communication schemes such as Wi-Fi.

In addition, the method of forming a local network by Bluetooth, Wi-Fi schemes, etc., may depend on a security connection procedure, and the Bluetooth or Wi-Fi schemes are known technologies and therefore a detailed description thereof will be omitted.

In step S210, the terminal 2 200, which is the master terminal, may request terminal information to other terminals. The terminal 2 200 may transmit a message requesting the terminal information to the terminal 1 100 and the terminal 3 300 to the terminal N 500, respectively, via the local network formed by the above-described method.

For example, the terminal 2 200 may transmit information indicating that the terminal 2 200 is a master terminal to other terminals, request information on antennas and SIMs included in each terminal, and request information on a terminal address and functions of a terminal.

If the terminal 1 100 and the terminal 3 300 to the terminal N 500 transmit their own terminal information, in step S220, the terminal 2 200 may receive the terminal information. For example, the terminal 1 100 and the terminal 3 300 to the terminal N 500 may transmit the information on the antenna and the SIM, the terminal address, and the functions of the terminal to the terminal 2 200.

Specifically, the terminal information may include the information on the antennas and the SIMs included in each terminal. For example, the terminal 1 100 may transmit information including one antenna, one USIM, and one eSIM to the terminal 2 200.

In addition, the terminal information may include information on functions of each terminal. For example, the terminal information may include information such as presence or absence of a display of a terminal, a size of a display, presence or absence of a speaker, a type of UIs, and performance of a CPU.

In step S230, the terminal 2 200 may establish a connection relationship between each antenna and SIM and a processing terminal based on the received terminal information. For example, based on the terminal information, the terminals 100 to 500 are located in countries other than the first subscription country to perform roaming, the terminal 1 100 includes an eSIM in which a profile capable of using a wireless communication service in the other countries is installed, and if it is determined that the terminal 2 200 is a smartphone including various UIs along with the largest display to provide convenience to a user, the terminal 2 200 may establish the connection between the eSIM of the terminal 1 100 and the antenna of the terminal 2 200.

In addition, based on the terminal information, if it is determined that the terminal 3 300 has the fastest operation speed and includes the most various functions among the terminals in the group, the terminal 2 200 may determine the terminal 3 300 as the processing terminal.

The processing terminal is a terminal for processing voice or data traffic transmitted and received through a plurality of antennas. Specifically, the processing terminal may process voice or data traffic transmitted/received through an antenna included in not only the processing terminal but also other terminals in the group.

The data traffic is transmitted and received through the antenna of the terminal 2 200 based on the subscription information of the eSIM of the terminal 1 100 having the connection relationship with the antenna. At this time, the display of the terminal 3 300 may display information (e.g., web browser) based on transmission/reception of the data traffic. As described above, the processing terminal may receive information through a local network established between the terminals in the group based on the transmission/reception of the data traffic.

Meanwhile, the step S230 may proceed when a user command is input to the terminal 2 200. For example, the step S230 may proceed when a user command for connecting an antenna and a SIM using terminal information received from terminals in a SIM group and determining a processing terminal is input.

In step S240, the terminal 2 200 may transmit the connection relationship between each antenna and the SIM and the establishment result of the processing terminal to each terminal. For example, the terminal 2 200 may transmit an identifier of the antenna and the SIM connected to each other in the group and a terminal address including the antenna and the SIM and a terminal address of the processing terminal to each terminal. At this time, as described above, the terminal 2 200 may transmit the establishment result through the local network established between the terminals in the group.

A plurality of terminals in the group, which have received the establishment result from the terminal 2 200, may connect between the antenna and the SIM based on the establishment result. The antenna and the SIM may be connected to each other in a wired or wireless manner. If the wired connection already exists, the wired connection may be activated based on the establishment result. In addition, if a wireless connection is established, a Bluetooth SIM access profile (BT SAP) may be used.

Figure 3:
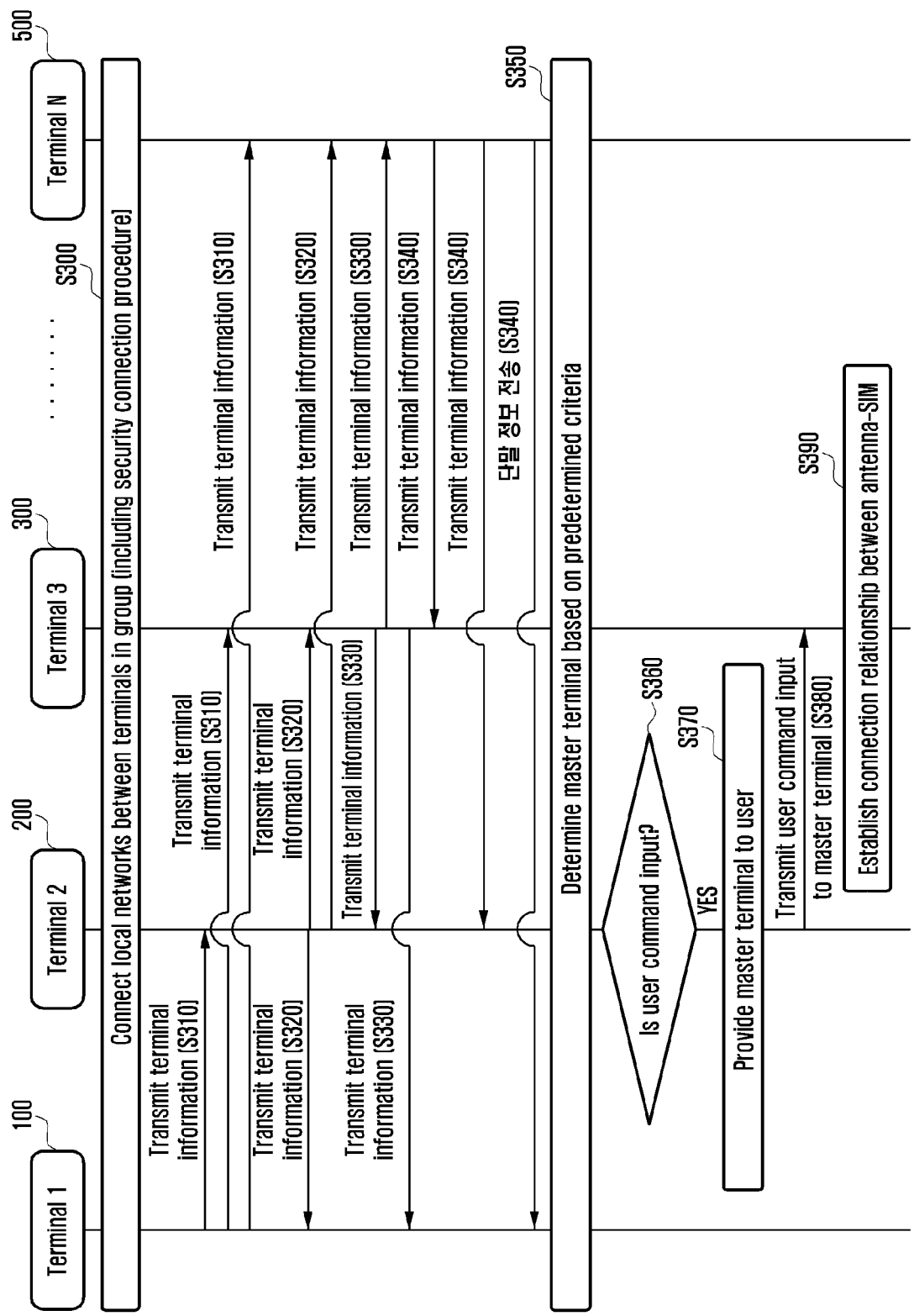
FIG. 3 illustrates another method for connecting between antennas and SIMs included in a plurality of terminals according to another embodiment of the present disclosure.

Meanwhile, unlike FIG. 2, FIG. 3 illustrates a connection method of an antenna and a SIM between terminals in a case in which a master terminal is not separately set.

The terminal 1 100, the terminal 2 200, the terminal 3 300 and the terminal N 500 of FIG. 3 are terminals included in the same SIM group as described above, and may be any one of wearable devices such as a smartphone, a tablet PC, a mobile phone, a smart car, a desktop PC, a laptop PC, a netbook computer, a PDA, a PMP, and a smart watch.

First, in step S300, local networks between terminals in a group may be connected. For example, the terminals in the group may include a Bluetooth module. The terminals may perform Bluetooth pairing using the Bluetooth module to form a wireless network.

On the other hand, the use of Bluetooth as the connection method of local networks between terminals in a group is only an example, and therefore a wireless network may be formed by various communication schemes such as Wi-Fi.

In addition, the method of forming a local network by Bluetooth, Wi-Fi schemes, etc., may depend on a security connection procedure, and the Bluetooth or Wi-Fi schemes are known technologies and therefore a detailed description thereof will be omitted.

Each terminal forming the local network may transmit each terminal's own terminal information to other terminals if it knows the addresses of other terminals in the local network in advance. Specifically, in step S310, the terminal 1 100 may transmit the terminal 1's own terminal information to the terminal 2 200 and the terminal 3 300 to the terminal N 500. In step S320, the terminal 2 200 may transmit the terminal 2's own terminal information to the terminal 1 100 and the terminal 3 300 to the terminal N 500. In step S330, the terminal 3 300 may transmit the terminal 3's own terminal information to the terminal 1 100 and the terminal 2 200 to the terminal N 500. In step S340, the terminal N 500 may transmit the terminal N's own terminal information to the terminal 1 100, the terminal 2 200, the terminal 3 300 or the like.

Since steps S310 to S340 in FIG. 3 are not illustrated in time order, the order in which each terminal transmits each terminal's own terminal information is not specified.

In addition, the terminal information may include the information on the antennas and the SIMs included in each terminal and the information on the functions of the terminal.

On the other hand, if there is no address information of other terminals in the local network, each terminal may broadcast each terminal's own terminal information and transmit the broadcast terminal information to other terminals. For example, each terminal may broadcast a message including the terminal information so that all terminals within a certain distance may receive their own terminal information from each terminal.

If the terminal information of the terminals are shared by the above-mentioned method, in step S350, the terminal 1 100, the terminal 2 200, and the terminal 3 300 to the terminal N 500 may determine the master terminal based on the predetermined criteria.

The predetermined criteria may be shared when the local network is formed between the terminals. Alternatively, if the terminals share their own terminal information, the terminals may share information on the predetermined criteria.

For example, it may be established that the master terminal is determined based on the operation speed. At this time, the terminals may determine the terminal with the highest operation speed as the master terminal. For example, if the terminal information is shared including the information on the operation speed, the master terminal may be determined based on the comparison result of the operation speed.

In step S360, if a user command is input, in step S370, information on the master terminal may be presented to a user. For example, if a user command for connecting an antenna and a SIM and determining a processing terminal based on the terminal information received from the terminals in the SIM group is input, the terminal 2 200 may inform the user that the terminal 3 300 is determined as the master terminal through a display, a speaker, or the like.

In step S380, any of the terminals may transmit a user input to the master terminal.

Further, in step S390, the terminal determined as the master terminal may establish the connection relationship between the antenna and the SIM based on the shared terminal information as described above.

Meanwhile, the steps S360 to S380 are not essential steps, and therefore may be omitted according to the embodiment. In this case, in step S350, the master terminal is determined as the terminal 300 based on the predetermined criteria, and if the information that the terminal 3 300 is determined as the master terminal is shared by the terminals in the group, the terminal 3 300 may directly establish the connection relationship between the antenna and the SIM.

Figure 4:
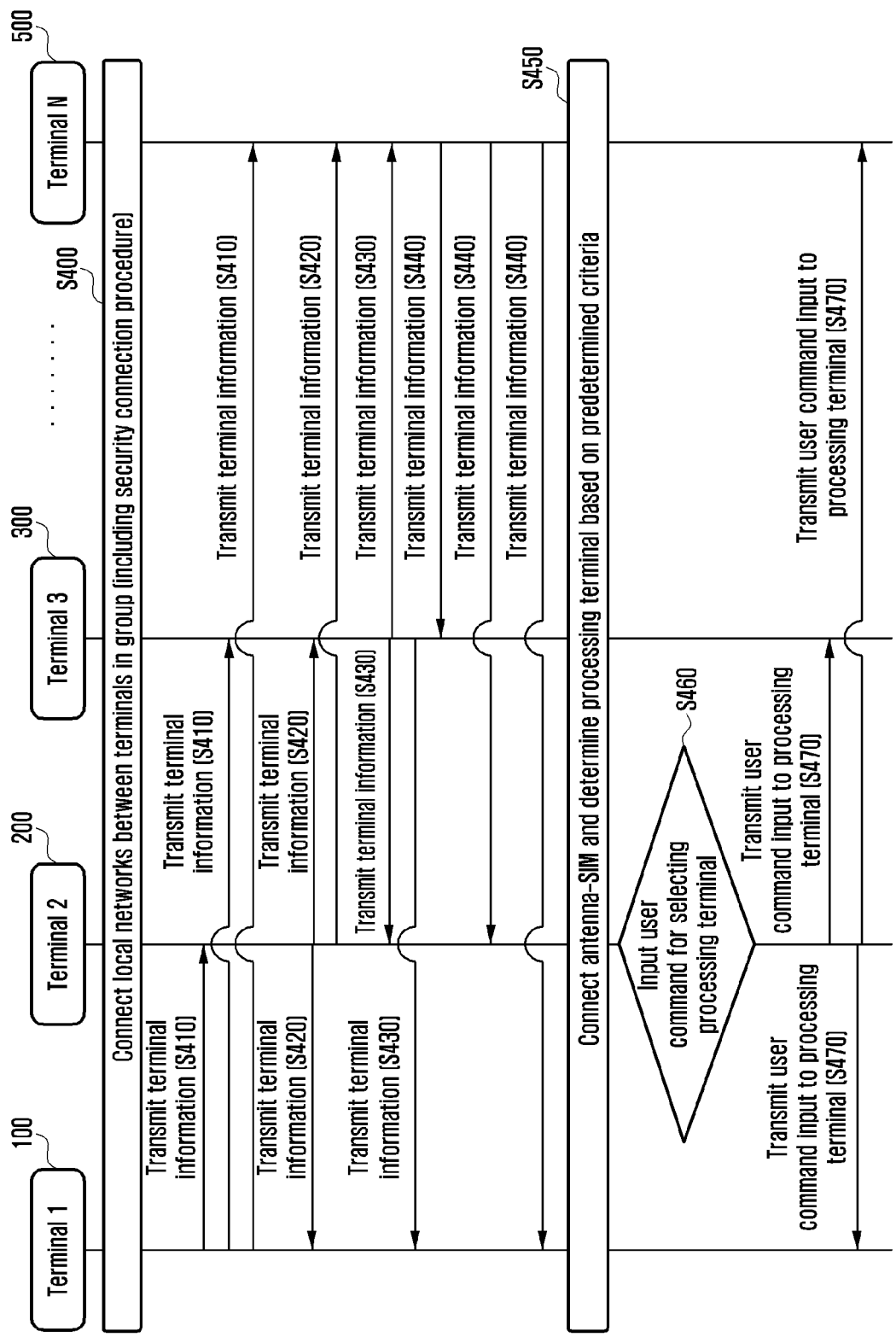
FIG. 4 illustrates yet another method for connecting between antennas and SIMs included in a plurality of terminals according to an embodiment of the present disclosure.

Alternatively, according to another embodiment of the present disclosure, as illustrated in FIG. 4, all terminals may determine the connection between the antenna and the SIM and the processing terminal under the same criteria, based on the shared terminal information.

First, in steps S400 to S440, as described above, a wireless network connection may be established between a plurality of terminals in a group and terminal information may be shared.

In step S450, the connection between the antenna and the SIM and the processing terminal may be determined based on the predetermined criteria. Specifically, the predetermined criteria may be shared when the local network is formed between the terminals. Alternatively, if the terminals share their own terminal information, the terminals may share information on the predetermined criteria.

For example, one of the predetermined criteria may be that the antenna of the terminal having the largest display and an eSIM having a profile of a service provider with the lowest wireless communication usage fee at the location where the terminal group exists are connected to each other. Depending on the criterion, the terminals may be determined as connecting between the antenna of the terminal 1 100 which is a smartphone and the eSIM of the terminal 3 300 including the eSIM in which the profile of the service provider with the lowest wireless communication usage fee is installed.

Also, the processing terminal may be determined based on the predetermined criteria. For example, the criteria for determining the terminal as the processing terminal may be the largest display and the most various functions among the terminals in the group.

As described above, the processing terminal is a terminal for processing voice or data traffic transmitted and received through a plurality of antennas. Specifically, the processing terminal may process voice or data traffic transmitted/received through an antenna included in not only the processing terminal but also other terminals in the group.

Meanwhile, in step S460, if a user command is input to any terminal, in step S470, any terminal may transmit a user input to other terminals in the SIM group.

For example, the step S230 may proceed when the user command for connecting an antenna and a SIM using terminal information received from terminals in a SIM group through any of the terminals is input.

Meanwhile, the steps S460 and S470 are not essential steps, and therefore may be omitted according to the embodiment. In this case, based on the connection between the antenna and the SIM determined in step S450, the connection between the SIM and the antenna and the SIM between the terminals in the SIM group may be processed. Voice or data traffic transmitted and received through a plurality of antennas in the SIM group may be processed by the processing terminal determined in step S450. For example, data received via any antenna in the SIM group through the display of the processing terminal may be displayed.

Figure 5:
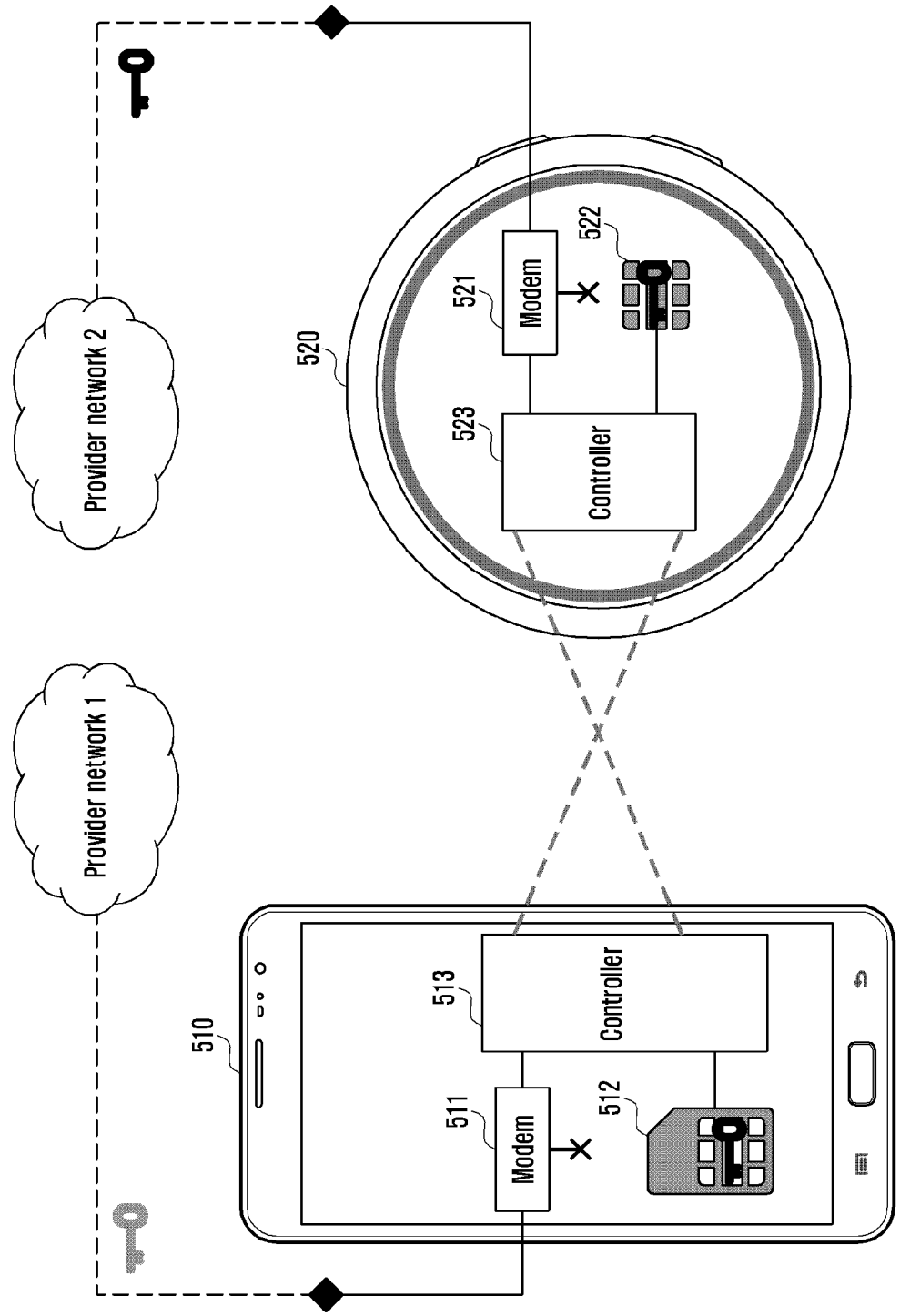
FIG. 5 illustrates a method for connecting between antennas and SIMs included in a first terminal and a second terminal according to an embodiment of the present disclosure.

Meanwhile, FIG. 5 illustrates another method for connecting between antennas and SIMs included in a first terminal 510 and a second terminal 520 according to an embodiment of the present disclosure. According to the embodiment of the present disclosure, the first terminal 510 illustrates a smartphone that includes a modem 511 including one antenna and a USIM 512 and the second terminal 520 includes a modem 521 connected to one antenna and an eSIM 522. However, this is only an example, and the type of terminals, the number of antennas included in the terminal, and the number and type of SIMs are not limited.

In general, the modem 511 of the first terminal 510 is connected to the USIM 512, and the user may use the wireless communication service provided by a provider of the USIM through the first terminal 510.

In general, the modem 520 of the first terminal 521 is connected to the eSIM 522 in which the profile is installed, and the user may use the wireless communication service provided by the provider of the USIM through the second terminal 520.

According to the embodiment of the present disclosure, the modem 511 of the first terminal 510 may be connected to the eSIM 522 of the second terminal 520 and the modem 521 of the second terminal 520 may be connected to the USIM 512 of the first terminal, thereby providing a wireless communication service.

The controller 513 may control the first terminal 510 as a whole. Specifically, the controller 513 may connect between the first terminal 510 and the second terminal 520 through near field communication. For example, the first terminal 510 may perform the near field communication with the second terminal 520 through communication schemes such as Bluetooth or Wi-Fi.

The controller 513 can receive the subscription information from the eSIM 522 included in the second terminal 520 using the near field communication. For example, the controller 513 may acquire a credential previously stored in the eSIM 522. The credential previously stored in the eSIM 522 may include cryptographic private information for accessing a network of a wireless carrier providing the eSIM 522 and a number for identifying the eSIM 522. Accordingly, the controller 513 can access a first operator network through the modem 511 using the obtained credentials.

As a result, the first terminal 510 may perform wireless communication through the modem 511 of the first terminal 510 and an RF module connected thereto based on the information on the eSIM 522 of the second terminal 520.

In addition, if the controller 513 receives an authentication request from the first operator network while accessing the first operator network and using the wireless communication service, the controller 513 of the first terminal 510 may again receive the credential previously stored in the eSIM 522 of the second terminal 520 using the near field communication scheme.

Meanwhile, the controller 523 may control the second terminal 520 as a whole. Specifically, the controller 523 may connect between the first terminal 510 and the second terminal 520 through near field communication. For example, the second terminal 520 may perform the near field communication with the first terminal 510 through the communication schemes such as Bluetooth or Wi-Fi The controller 523 can receive the subscription information from the USIM 512 included in the first terminal 510 using the near field communication. For example, the controller 523 may acquire a credential previously stored in the USIM 512. The credential previously stored in the USIM 512 may include cryptographic private information for accessing a network of a wireless carrier providing the USIM 512 and a number for identifying the USIM 512. Accordingly, the controller 523 can access a second operator network through the modem 521 using the obtained credentials.

As a result, the second terminal 510 may perform wireless communication through the modem 521 of the second terminal 520 and an RF module connected thereto based on the information on the USIM 512 of the first terminal 510.

In addition, if the controller 523 receives an authentication request from the second operator network while accessing the second operator network and using the wireless communication service, the controller 523 of the second terminal 520 may again receive the credential previously stored in the USIM 512 of the first terminal 510 using the near field communication scheme.

In FIG. 5, the controller 513 of the first terminal 510 does not necessarily exist at the same time. If necessary, the controller 513 of the first terminal 510 serves as the controller 523 of the second terminal 520 may also serve as the controller 523 of the second terminal 520, or otherwise, the controller 523 of the second terminal 520 may also serve as the controller 513 of the first terminal 510.

For example, if a program or an application capable of controlling the second terminal 520 is installed in the first terminal 510, the controller 513 of the first terminal 510 may control the second terminal 520 using the program or the application.

By the terminals as illustrated in FIG. 5, the user may perform wireless communication based on the information on the SIMs included in other terminals.

Figure 6:
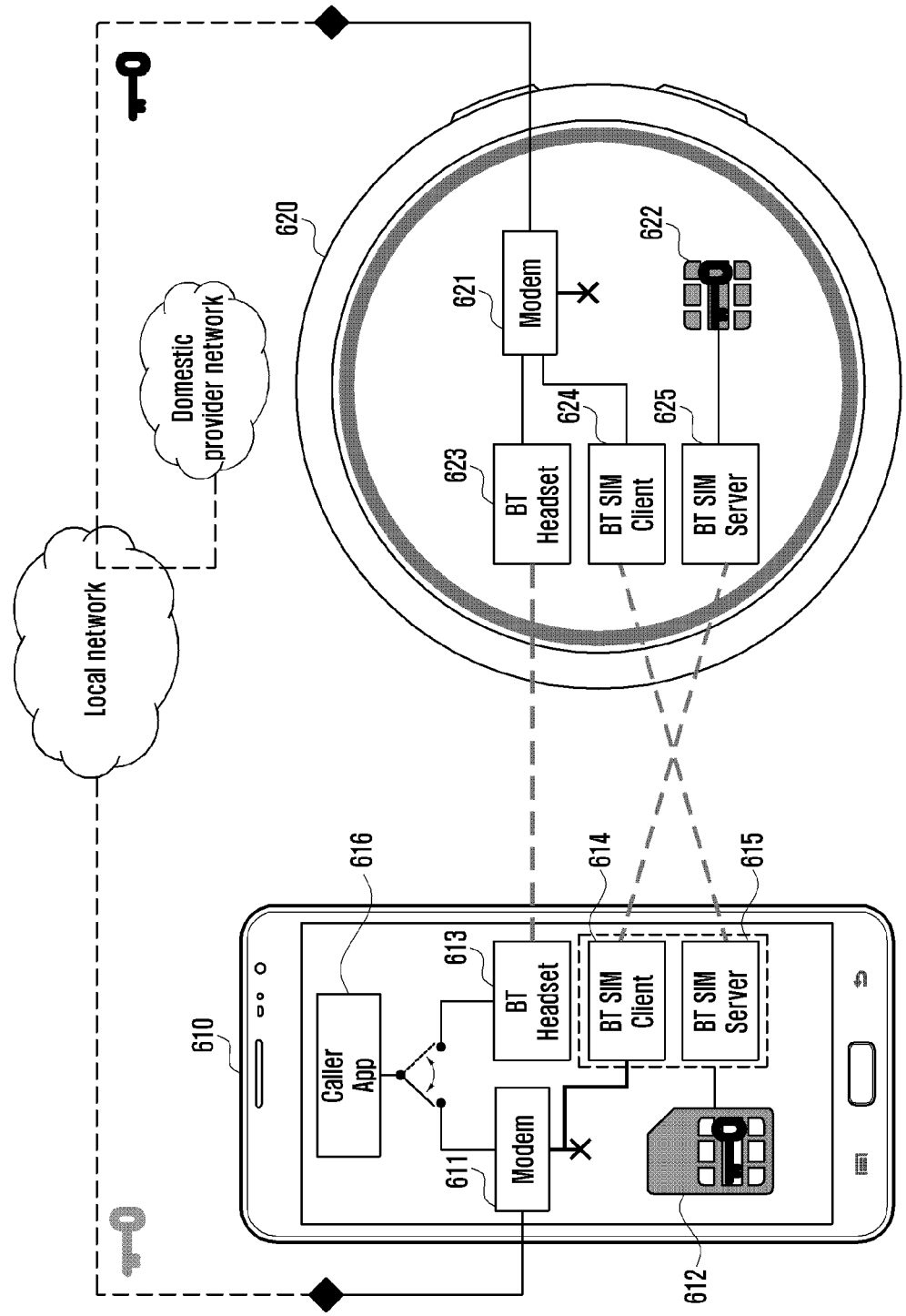
FIG. 6 illustrates another method for connecting between antennas and SIMs included in a first terminal and a second terminal according to an embodiment of the present disclosure.

Meanwhile, FIG. 6 illustrates another method for connecting between antennas and SIMs included in a first terminal and a second terminal according to an embodiment of the present disclosure.

Referring to FIG. 6 according to a detailed embodiment of the present disclosure, a first terminal 610 is a terminal that includes a USIM 612 equipped with a SIM card of an original subscription country (within country) or may use a wireless communication service provided by a domestic provider based on subscription information of the USIM 612.

Meanwhile, the second terminal 620 includes a terminal that includes an eSIM 622 capable of installing, changing, and deleting a profile of a provider providing a wireless communication service and may use a wireless terminal service terminal based on the profile installed in the eSIM 622.

The first terminal 610 and the second terminal 620 include a Bluetooth module and may be connected by a near field communication scheme through Bluetooth pairing.

If roaming is detected in the first terminal 610 and the second terminal 620, the first terminal 610 including the USIM 612 of a domestic provider may use a roaming service provided by the domestic carrier through the USIM 612 equipped with a profile of the domestic provider.

In addition, the second terminal 620 may install in the eSIM 622 a profile of a provider that provides a wireless communication service in an area where roaming is generated. The wireless communication network of the provider providing the wireless communication service in the area where the roaming is generated may be cheaper than the wireless communication network provided by the domestic service provider in the area where the roaming is generated.

As illustrated, if the first terminal 610 is a smartphone and the second terminal 620 is a wearable device such as a smart watch, a terminal that is mostly easily used by a user may be the first terminal 610.

In such a case, the present disclosure may be used to allow a user to utilize a cheaper wireless communication service through the first terminal 610 that provides various functions including a larger display.

In detail, a modem 611 of the first terminal 610 may be connected to the eSIM 622 of the second terminal 620 and a modem 621 of the second terminal 620 may be connected to the USIM 612 of the first terminal, thereby providing a wireless communication service.

For example, the first terminal 610 and the second terminal 620 may perform near field communication through the Bluetooth scheme.

The subscription information stored in the eSIM 622 of the second terminal 620 may be transmitted to a Bluetooth SIM client 614 of the first terminal 610 through a Bluetooth SIM server 625 of the second terminal 620. The subscription information may include a credential including an identifier for accessing a wireless communication network and an encrypted key.

The Bluetooth SIM client 614 of the first terminal 610 may transmit the received subscription information stored in the eSIM 622 to the modem 611 of the first terminal 610. The modem 611 of the first terminal 610 may access a network of a local service provider providing the profile installed in the eSIM 622 of the second terminal 620 using the credential.

Accordingly, the user may use the wireless communication service provided by the local service provider through the modem 611 of the first terminal 610 and an RF module connected thereto.

Meanwhile, the subscription information stored in the USIM 612 of the first terminal 610 may be transmitted to a Bluetooth SIM client 624 of the second terminal 610 through the Bluetooth SIM server 615 of the first terminal 610. The subscription information may include the credential.

The Bluetooth SIM client 624 of the second terminal 620 may transmit the received subscription information stored in the USIM 612 of the first terminal 610 to the modem 621 of the second terminal 620. The modem 621 of the second terminal 620 may access the network of the domestic provider providing the USIM 612 using the credential.

Accordingly, the user may continuously use the wireless communication service provided by the domestic provider through the modem 621 of the second terminal 620 and an RF module connected thereto.

Meanwhile, the first terminal 610 may further include a caller application 616 for a call. The caller App 616 may be selectively connected to the Bluetooth headset 613 or the modem 611.

For example, if a call is received domestically through a domestic operator network, the caller App 616 may be connected to the modem 621 of the second terminal 620 through a Bluetooth headset 613 of the first terminal 610. At this time, the voice data received through the modem 621 of the second terminal 620 are transmitted to the Bluetooth headset 623 of the second terminal 620 and the voice data may be transmitted to the caller App 616 through the Bluetooth headset 613 of the first terminal 610 by the Bluetooth communication and output from the first terminal 610.

On the other hand, if a call is received locally through a local service operator network, the caller App 616 may be directly connected to the modem 611 of the first terminal 610. Accordingly, the voice data received through the modem 611 of the first terminal 610 may be output from the first terminal 610.

Accordingly, the user may receive all voice calls received through the domestic or local network through the first terminal 610.

Meanwhile, if an origination command of a voice call is input through the first terminal 610, the user can select a communication network for the voice call.

For example, the first terminal 610 may provide information that a terminal available for allowing a user to perform a voice call through the display is the first terminal 610 and the second terminal 620 through the display.

If a command for performing voice origination is input from the user through the network of the domestic provider, the caller App 616 may be connected to the Bluetooth headset 613. Accordingly, the voice data input and output through the first terminal 610 may be transmitted to and received from the Bluetooth headset 623 of the second terminal 620 through the Bluetooth headset 613. Further, the voice data may be transmitted to and received from the network of the domestic provider through the modem 621 of the second terminal 620 connected to the Bluetooth headset 623.

On the other hand, if the command for performing the voice origination is input from the user through the network of the domestic provider, the caller App 616 may be connected to the modem 611 of the first terminal 610. Therefore, the voice data input/output through the first terminal 610 may be transmitted/received through the network of the local service provider using the modem 611 and the RF module connected to the modem 611.

Even when a user transmits/receives data traffic, the user may select a communication network to use the wireless communication service. In general, however, upon roaming, the usage fee of the wireless communication network provided by the local service provider may be cheap. Therefore, the caller App 616 performs the same function as the web browser in the case of transmitting and receiving the data traffic according to the setting and user command and may be connected to the modem 611 of the first terminal 610 to use the local operator network based on the subscription information of the eSIM 622 of the second terminal 620.

Figure 7A:
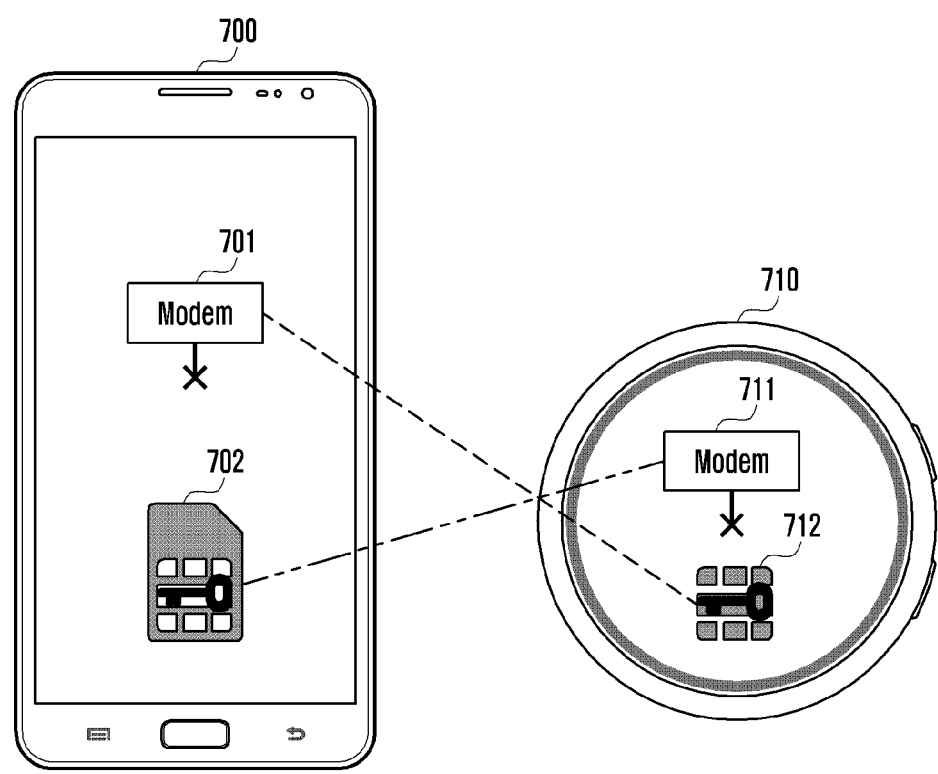
FIGS. 7A to 7C illustrate methods for connecting between antennas and SIMs included in a first terminal and a second terminal according to various embodiments of the present disclosure.
Figure 7B:
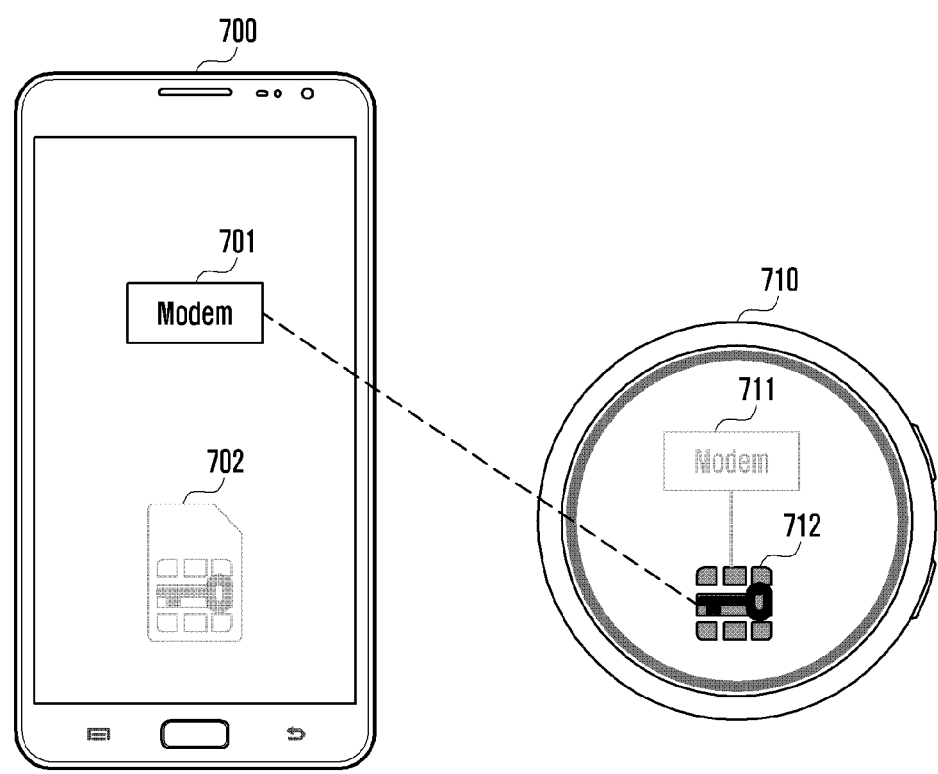
Figure 7C:
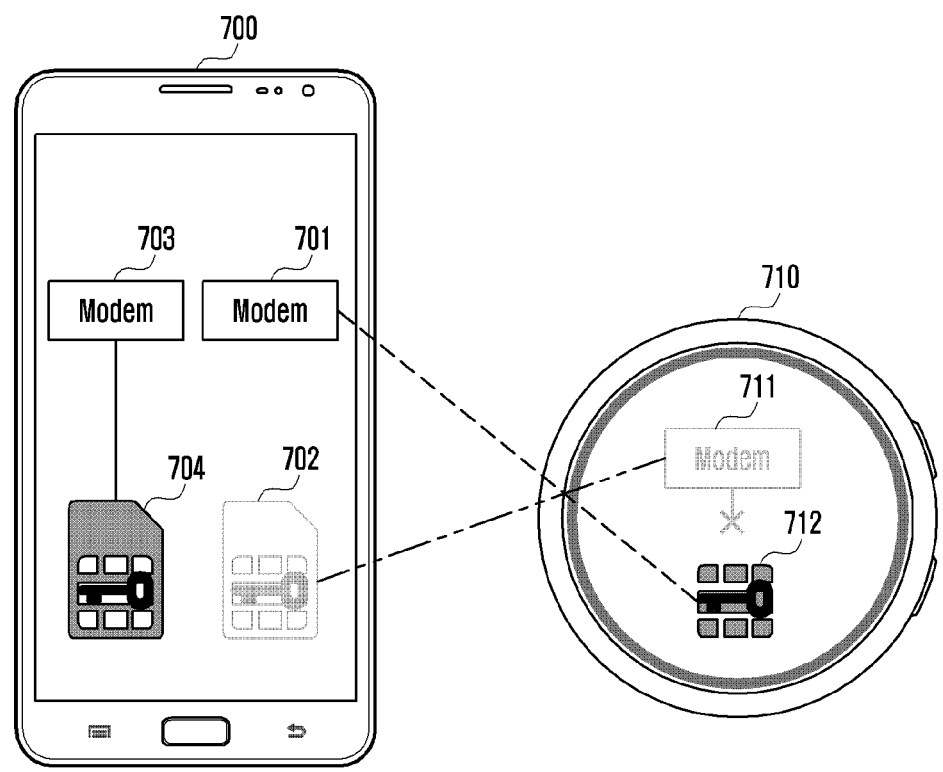

Meanwhile, FIGS. 7A to 7C illustrate methods for connecting between antennas and SIMs between a first terminal and a second terminal according to various embodiments of the present disclosure.

FIG. 7A illustrates an embodiment in which a modem 701 of a first terminal 700 acquires information included in an eSIM 712 of a second terminal 710 to perform wireless communication and a modem 711 of the second terminal 710 acquires information included in an USIM 702 of the first terminal 700 to perform wireless communication.

FIG. 7B illustrates an embodiment in which the modem 701 of the first terminal 700 acquires the information included in the eSIM 712 of the second terminal 710 to perform wireless communication. For example, the embodiment corresponds to the case in which upon roaming, a user installs a local profile in the eSIM 712 of the second terminal 710 using the first terminal 700 and wants to use a cheap local wireless communication service. At this time, the USIM 702 of the first terminal 700 may be inactivated.

In addition, if necessary, the modem 701 may be connected to the USIM 702 and access the wireless communication network of the domestic provider using the information stored in the USIM 702. Alternatively, the modem 711 of the second terminal 710 may be connected to the USIM 702 and may also be connected to the wireless communication network of the domestic provider through the second terminal 710.

FIG. 7C illustrates an embodiment illustrating the case where the first terminal 700 is a dual-SIM terminal. The first modem 701 of the first terminal 700 may acquire information included in the eSIM 712 of the second terminal 710 to perform wireless communication. The second modem 703 of the first terminal 700 may be connected to a second USIM 704 of the first terminal 700 and may use the information stored in the second USIM 704 of the first terminal 700 to access the wireless communication network of the domestic provider.

Figure 8:
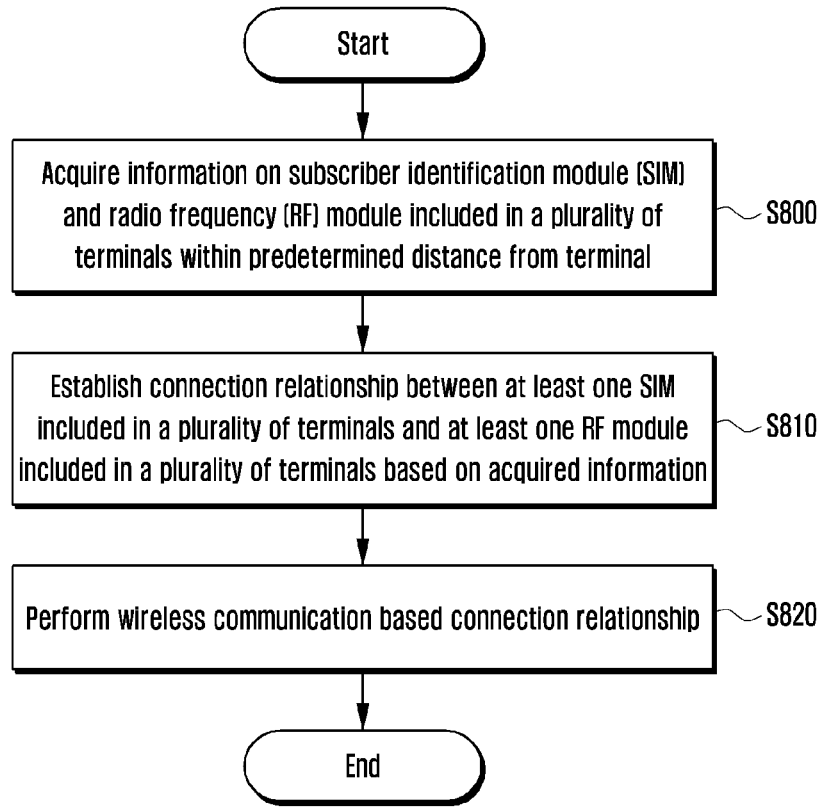
FIG. 8 illustrates a method for performing, by a terminal, wireless communication according to an embodiment of the present disclosure.

Meanwhile, FIG. 8 illustrates a method for performing, by a terminal, wireless communication according to an embodiment of the present disclosure.

In step S800, a terminal including at least one subscriber identification module (SIM) may acquire information on a subscriber identification module (SIM) and a radio frequency (RF) identification module included in a plurality of terminals within a predetermined distance from the terminal. For example, the terminal may be connected to a plurality of terminals within a predetermined distance using local communication schemes such as Bluetooth or Wi-Fi. Accordingly, the terminal may receive terminal information including the information on the SIM and the RF module from a plurality of terminals within the predetermined distance.

In step S810, the terminal may establish a connection relationship between at least one SIM included in the plurality of terminals and at least one RF module included in the plurality of terminals. For example, the terminal may establish the connection between the SIM included in the first terminal and the RF module included in the second terminal. Alternatively, the terminal may establish the connection between the SIM included in the terminal and the RF module included in the third terminal.

In step S820, the terminal may perform the wireless communication based on the connection relationship. Specifically, the terminal may transmit the information on the connection relationship established by the plurality of terminals. Each terminal may receive information pre-stored in SIMs of other terminals having the connection relation with each terminal's own RF module and access the wireless communication network based on the received information.

Figure 9:
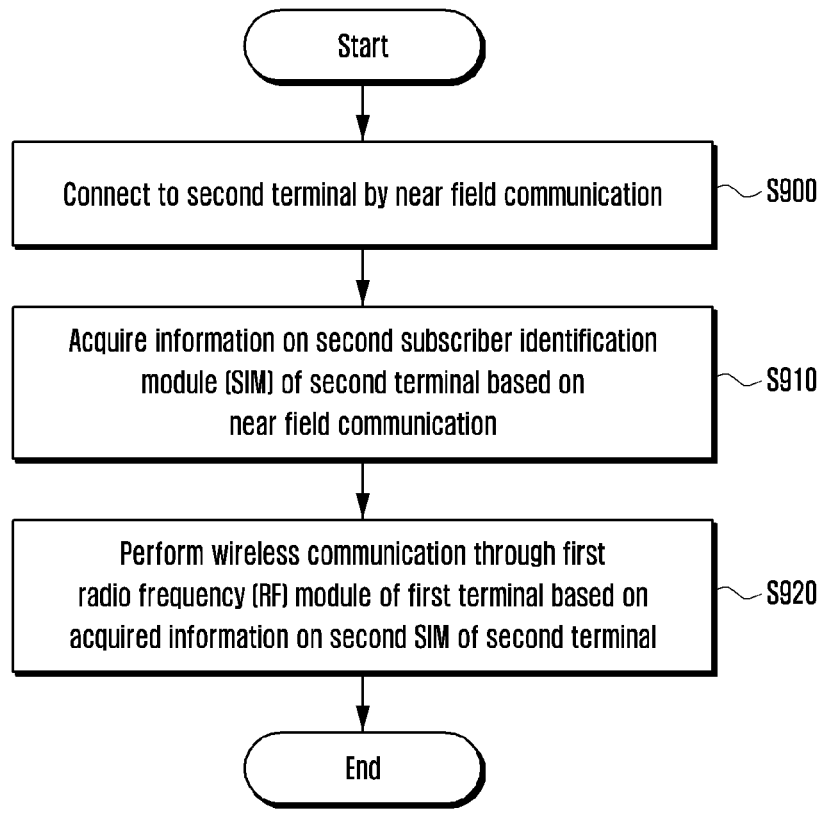
FIG. 9 illustrates another method for performing, by a terminal, wireless communication according to an embodiment of the present disclosure.

Meanwhile, FIG. 9 illustrates another method for performing, by a terminal, wireless communication according to an embodiment of the present disclosure.

In step S900, a first terminal including a first subscriber identification module (SIM) may be connected to a second terminal using near field communication.

In step S910, the terminal may acquire information on a second subscriber identification module (SIM) of the second terminal using near field communication.

In step S920, the terminal may perform wireless communication through a first RF module of the first terminal based on the acquired information on the second SIM of the second terminal.

Figure 10:
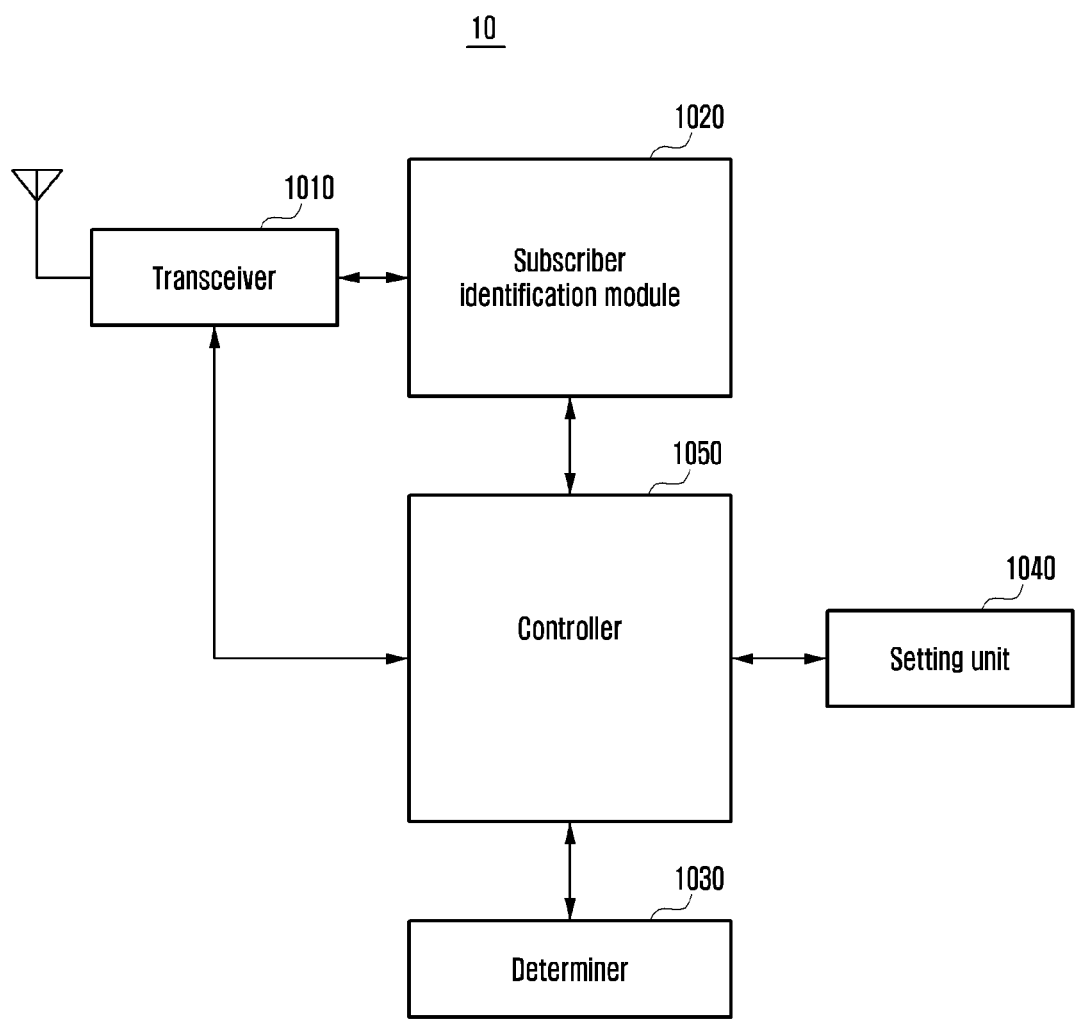
FIG. 10 illustrates a configuration of a terminal according to an embodiment of the present disclosure.

Meanwhile, FIG. 10 illustrates a configuration of a terminal 10 according to an embodiment of the present disclosure. As illustrated, the terminal 10 may include a transceiver 1010, a subscriber identification module (SIM) 1020, a determiner 1030, a setting unit 1040, and a controller 1050.

The transceiver 1010 is a component for transmitting and receiving a signal to and from an external device. The transceiver may include an RF module and a modem including an antenna.

A subscriber identification module (SIM) 1020 may include a storage area. The SIM may store subscription information such as the identifier of the SIM and authentication information in the storage area. Alternatively, the SIM 1020 may further include an insertion section for a SIM-card. At this time, the identifier, the authentication information or the like may be stored in the SIM-card, and the SIM 1020 may use the information stored in the SIM card.

The determiner 1030 may use terminal information of other terminals transmitted and received to determine types and features of antennas and SIMs included in other terminals. For example, if the terminal 10 performs near field communication with other terminals through the Bluetooth pairing or the like, the terminal 10 may receive terminal information from other terminals by the near field communication method. At this time, the determiner 1030 can determine the information on the antennas and the SIMs of other terminals based on the received terminal information.

The determiner 1030 may determine functions, hardware characteristics or the like of other terminals based on the terminal information. For example, the determiner 1030 terminal information may determine presence or absence of a display of a terminal, a size of a display, presence or absence of a speaker, a type of UIs, performance of a CPU, or the like.

The setting unit 1040 may set connection relationships between antennas and SIMs included in a plurality of terminals based on the determination result of the determiner 1030. As described above, the established connection relationship may be transmitted to each terminal by a near field communication scheme or may be broadcast to a plurality of terminals through the transceiver 1010.

The controller 1050 is a component for controlling the terminal 10 as a whole. The controller 1050 may transmit the determination result of the determiner 1030 and the establishment result of the setting unit 1040. Alternatively, the controller 1050 may serve as the determiner 1030 and the setting unit 1040.

For example, the controller 1050 may perform a control to acquire information on subscriber identification modules (SIM) and radio frequency (RF) modules included in a plurality of terminals within a predetermined distance from the terminal 10. In step S810, the controller 1050 may establish a connection relationship between at least one SIM included in the plurality of terminals and at least one RF module included in the plurality of terminals based on the acquired information. The controller 1050 may perform a control to perform wireless communication based on the connection relationship.

For example, the controller 1050 may establish a connection relationship so that the RF modules included in other terminals perform communication based on the information on the SIM of any of the plurality of terminals.

On the other hand, the controller 1050 may determine a processing terminal that outputs information on wireless communication performed based on the connection relationship, according to a user command or predetermined conditions.

In addition, the controller 1050 may perform a control to acquire information on the functions of the plurality of terminals. The controller 1050 may determine a terminal capable of outputting information on the wireless communication as the processing terminal based on the acquired information on the functions.

The controller 1050 may transmit the information on the processing terminal and the information on the connection relationship to the plurality of terminals. The controller 1050 may perform a control to broadcast information through the transceiver 1010. Alternatively, the controller 1050 may also transmit the information to the plurality of terminals by a near field communication scheme.

The controller 1050 may provide the information on the determined processing terminal to the user. For example, the controller 1050 can provide the information on the determined processing terminal to a user through an output section (not illustrated) such as a display (not illustrated) or a speaker (not illustrated).

If a user command for selecting the processing terminal is input, the controller 1050 may perform a control to transmit a message for the processing terminal determination to the processing terminal.

On the other hand, the controller 1050 may acquire the information on the SIMs of other terminals from the other terminals connected by the near field wireless communication scheme. The controller 1050 may perform a control to perform the wireless communication through the RF module of the terminal 10 based on the obtained information on the SIMs of other terminals.

The controller 1050 may transmit the information on the SIM 1020 to other terminals by the near field communication. Based on the transmitted information on the SIM 1020, the wireless communication may be performed through the RF module of the other terminal.

On the other hand, if signals are received through the RF modules of the other terminals based on the information on the SIM 1020 of the terminal 10, the terminal 10 may receive the signals by the near field communication.

The controller 1050 may display a UI to perform wireless communication based on the information on the SIM 1020 of the terminal 10 or the information on the SIM of the other terminals.

If a command for selecting a UI corresponding to the information on the SIM 1020 is input, the controller 1050 may perform a control to perform the wireless communication through the RF modules of the other terminals. On the other hand, if a command for selecting a UI corresponding to the information on the SIM 1020 of the other terminals is input, the controller 1050 may perform a control to perform the wireless communication through the RF module of the terminal 10.

If a predetermined event is generated, the controller 1050 may perform a control to terminate the wireless communication through the RF modules based on the information on the SIMs of the other terminals. For example, if a user command for performing wireless communication based on the subscription information of the SIM 1020 of the terminal 10 is input, the controller 1050 may perform a control to terminate the wireless communication through the RF modules based on the information on the SIMs of the other terminals.

The controller 1050 may perform a control to perform the wireless communication through the RF module based on the information on the SIM 1020.

Meanwhile, the terminal 10 may further include one or more SIM and RF modules. At this time, if the predetermined event is generated, the controller 1050 may perform a control to perform the wireless communication through the additional RF modules based on the information on the SIMs of the other terminals.

According to another embodiment of the present disclosure, if the terminal 10 is set as the processing terminal, the controller 1050 may control voice or data traffic transmitted and received through a plurality of terminals. For example, the controller 1050 may allow the RF module of the first terminal to use the credential stored in the SIM of the second terminal to display the received data traffic on the display (not illustrated) of the terminal 10. Alternatively, if a user input for transmitting data traffic through a wireless communication network of an accessible provider using the credential stored in the SIM of the second terminal is received by the terminal 10, the controller 1050 may use the near field communication scheme to transmit the data traffic to the first terminal.

By the terminal 10 as described above, the user may use at least two terminals to use the wireless communication service more easily and chiefly and in various ways.

Meanwhile, the components of the terminal described above may be implemented by software. For example, the controller of the terminal may further include a flash memory or other nonvolatile memories. In the nonvolatile memory, a program for performing each role of the controller may be stored.

Further, the controller of the terminal may be implemented in a form including a CPU and a random access memory (RAM). The CPU of the controller may copy the above-described programs stored in the nonvolatile memory into the RAM, and then execute the copied programs to perform the functions of the terminal as described above.

The controller is responsible for the control of the terminal. The controller may be used in the same meaning as a central processing unit, a microprocessor, a processor, an operating system, or the like. Further, the controller of the terminal may be implemented as a system-on-a-chip or a system on chip (SOC or SoC) along with other function sections such as the communication module included in the terminal.

Meanwhile, the communication method of the terminal according to various exemplary embodiments of the present disclosure as described above may be stored in a non-transitory readable medium while being coded in software. The non-transitory readable medium may be used while being equipped in various apparatuses.

The non-transitory computer readable medium is not a medium that stores data for a while, such as a register, a cache, and a memory, but means a medium that semi-permanently stores data and is readable by a device. In detail, the non-transitory computer readable medium may be a CD, a DVD, a hard disc, a Blueray disc, an USB, a memory card, an ROM, etc.

Although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a terminal including at least one subscriber identification module (SIM) and at least one radio frequency (RF) module, the method comprising:
receiving, from another terminal including at least one SIM and at least one RF module, first information including information on a number of the at least one SIM included in the another terminal and information on a class of the at least one SIM included in the another terminal, second information on the at least one RF module included in the another terminal, and third information on at least one function of the another terminal;
determining information on a connection relationship between one or more SIMs in a SIM group that includes the terminal and the another terminal and one or more RF modules in the SIM group based on the first information, the second information, the third information, fourth information on the at least one SIM included in the terminal and fifth information on the at least on RF module included in the terminal; and
transmitting, to the another terminal, the information on the connection relationship,
wherein the another terminal and the terminal form a wireless network for each other.

2. The method of claim 1, further comprising:
determining a processing terminal for outputting information on a wireless communication based on the third information on the at least one function of the another terminal and sixth information on at least one function of the terminal, among the terminal and the another terminal.

3. The method of claim 2, further comprising:
transmitting, to the another terminal, information on the processing terminal.

4. The method of claim 2, further comprising:
providing the information on the processing terminal for outputting information to a user; and
transmitting, to the processing terminal, a message for determining of the processing terminal based on a user command for selecting the processing terminal being input,
wherein the at least one RF module included in the another terminal is configured to establish the connection relationship with the at least one SIM included in the terminal.

5. A method of a first terminal including a first subscriber identification module (SIM) and a first radio frequency (RF) module, the method comprising:
receiving information on a second subscriber identification module (SIM) of a second terminal, the first terminal and the second terminal communicating using a near field communication;
receiving a signal using the first RF module of the first terminal based on the information received on the second SIM of the second terminal;
terminating the receiving the signal using the first RF module based on the information on the second SIM, according to a predetermined event being generated; and
determining a connection relationship between the first RF module and the first SIM.

6. The method of claim 5, further comprising:
transmitting the information on the first SIM to the second terminal using the near field communication, wherein a wireless communication is performed through a second RF module of the second terminal based on the information transmitted on the first SIM,
wherein a signal is received by the near field communication and processed if the signal is received through the second RF module of the second terminal based on the information on the first SIM of the first terminal.

7. The method of claim 6, further comprising:
displaying a user interface (UI) for performing the wireless communication based on at least one of the information on the first SIM of the first terminal or the information on the second SIM of the second terminal;
performing the wireless communication through the second RF module of the second terminal based on a command for selecting the UI corresponding to the information on the first SIM being input; and performing the wireless communication through the first RF module of the first terminal being input.

8. The method of claim 5, wherein a third RF module associated with a third SIM included in the first terminal is provided, and wherein a wireless communication is performed through the third RF module based on the information on the second SIM based on the predetermined event being generated.

9. A terminal including at least one subscriber identification module (SIM) and at least one radio frequency (RF) module, the terminal comprising:

a transceiver; and a controller configured to:

control the transceiver to receive from another terminal including at least one SIM and at least one RF module, first information on including information on a number of the at least one SIM included in the another terminal and information on a class of the at least one SIM included in the another terminal, second information on the at least one RF module included in the another terminal, and third information on at least one function of the another terminal, determine information on a connection relationship between one or more SIMs in a SIM group that includes the terminal and the another terminal and one or more RF modules in the SIM group based on the first information, the second information, third information, fourth information on the at least one SIM included in the terminal and fifth information on the at least one RF module included in the terminal, and control the transceiver to transmit, to the another terminal, the information on the connection relationship, wherein the another terminal and the terminal form a wireless network for each other.

10. The terminal of claim 9, wherein the controller is further configured to determine a processing terminal for outputting information on a wireless communication based on the third information on the at least one function of the another terminal and sixth information on at least one function of the terminal, among the terminal and the another terminal.

11. The terminal of claim 10, wherein the controller is further configured to control the transceiver to transmit, to the another terminal, information on the processing terminal and information on the connection relationship.

12. The terminal of claim 10, wherein the controller is further configured to:

provide information on the processing terminal for outputting information to a user; and control the transceiver to transmit, to the processing terminal, a message for determining the processing terminal based on a user command for selecting the processing terminal being input.

13. The terminal of claim 9, wherein the controller is further configured to set the at least one RF module included in the another terminal to establish the connection relationship with the at least one SIM included in the terminal.

14. A first terminal including a first subscriber identification module (SIM) and a first radio frequency (RF) module, the first terminal comprising:

a transceiver; and a controller configured to:

control the transceiver to receive information on a second subscriber identification module (SIM) of a second terminal, the first terminal and the second terminal communicating using a near field communication, control the transceiver to receive a signal using the first RF module of the first terminal based on the information received on the second SIM of the second terminal, terminate reception of the signal using the first RF module based on the information on the second SIM, according to a predetermined event being generated; and determine a connection relationship between the first RF module and the first SIM.

15. The first terminal of claim 14, wherein the controller is further configured to control the transceiver to transmit the information on the first SIM to the second terminal using the near field communication, and wherein a wireless communication is performed through a second RF module of the second terminal based on the information transmitted on the first SIM.

16. The first terminal of claim 15, wherein the controller is further configured to control the transceiver to receive and processes a signal using the near field communication based on the signal being received through the second RF module of the second terminal based on the information on the first SIM of the first terminal.

17. The first terminal of claim 15, wherein the controller is further configured to:

display a user interface (UI) for performing the wireless communication based on at least one of the information on the first SIM of the first terminal or the information on the second SIM of the second terminal;

perform the wireless communication through the second RF module of the second terminal based on a command for selecting the UI corresponding to the information on the first SIM being input; and perform the wireless communication through the first RF module of the first terminal based on a command for selecting the UI corresponding to the information on the second SIM being input.

18. The first terminal of claim 14, further comprising a third RF module associated with a third SIM included in the first terminal, wherein the controller is further configured to perform a wireless communication through the third RF module based on the information on the second SIM based on the predetermined event being generated.

* * * * *